United States Patent [19]

Miller et al.

[11] Patent Number: 4,501,830

[45] Date of Patent: Feb. 26, 1985

[54] RAPID SET LIGHTWEIGHT CEMENT PRODUCT

[75] Inventors: Richard Miller, Crofton; Janine M. Rizer, Mechanicsville, both of Md.

[73] Assignee: Research One Limited Partnership, Towson, Md.

[21] Appl. No.: 568,358

[22] Filed: Jan. 5, 1984

[51] Int. Cl.³ ............... C04B 7/02; C04B 7/32/7/35; C08G 51/24

[52] U.S. Cl. ..................... 523/401; 106/90; 106/97; 106/98

[58] Field of Search .................. 523/401; 106/90, 97, 106/98

[56] References Cited

U.S. PATENT DOCUMENTS

| | | | |
|---|---|---|---|
| 3,232,777 | 2/1966 | Bush | 106/90 |
| 3,240,736 | 3/1966 | Beckwith | 106/90 |
| 3,477,979 | 11/1969 | Hillyer | 523/401 |
| 3,782,985 | 1/1974 | Gebhardt | 106/97 |
| 3,853,577 | 12/1974 | Nishida et al. | 106/90 |
| 3,988,279 | 10/1976 | Klassen | 523/401 |
| 4,194,919 | 3/1980 | Hattori et al. | 106/97 |
| 4,210,457 | 7/1980 | Dodson et al. | 106/97 |
| 4,240,952 | 12/1980 | Hulbert et al. | 106/97 |
| 4,321,243 | 3/1982 | Cornwell et al. | 423/335 |

FOREIGN PATENT DOCUMENTS

| | | | |
|---|---|---|---|
| 737020 | 6/1966 | Canada | 523/401 |
| 2106813 | 8/1972 | Fed. Rep. of Germany | 523/401 |
| 52-73919 | 6/1977 | Japan | 523/401 |
| 56-155059 | 12/1981 | Japan | 523/401 |

Primary Examiner—Ronald W. Griffin
Attorney, Agent, or Firm—Lawrence I. Field

[57] ABSTRACT

A lightweight cement product formed from a mixture comprising cement, condensed silica fume, flyash, cenospheres, finely divided crystalline silica particles, epoxy emulsion, curing agent, accelerator and water which hardens in less than one hour to produce articles with a density less than 90 pounds per cubic foot and a tensile strength of at least 600 psi and a compressive strength of at least 6000 psi after curing for 1 day at 60° C.

8 Claims, No Drawings

RAPID SET LIGHTWEIGHT CEMENT PRODUCT

This invention relates to a lightweight cementitious product which hardens in less than one hour to a product which then possesses a desirable combination of physical properties. More particularly it relates to a material having a density less than 90 pounds per cubic foot and which achieves a tensile strength of at least 600 psi and a compressive strength of at least 6000 psi within a very short time after the cement mixture is formulated and poured into useful product shapes.

One specific object of this invention is to produce a mixture which hardens to a strong lightweight cement product in a very short time.

Another object is to use a Class H Portland cement to produce a rapid set lightweight cement product.

Other objects will be pointed out or will become apparent in the description which follows of a preferred embodiment of the invention.

Briefly, the products of this invention are produced from suitably formulated mixtures comprising the following:
  A. Portland Cement
  B. Aggregate
  C. Additives
  D. Water A. Portland Cement While it appears that any of the various grades of Portland Cement which are commercially available are suitable for the production of the material of this invention, Type III Portland Cement is preferred and the Portland Cement known as API Class H is particularly preferred. Class H is the coarsest grind of Portland Cements and is usually used to produce slow setting concretes. Its use to produce a product which sets rapidly is unconventional. The Portland Cement component comprises between about 35 and 45% by weight of the mixture, about 39.41% being particularly preferred.

B. Aggregate

In the present invention several aggregates are employed, usually comprising: flyash cenospheres, silica fume and finely divided particles of crystalline silica.

The flyash cenospheres are commercially sold as Fillite ® and are described in U.S. Pat. No. 3,782,985 the disclosure of which is incorporated in this specification by this reference.

Two kinds of silica are usually employed, one being a chemically active condensed silica fume and the other being a less chemically active crystalline silica particulate material.

The chemically active silica in the mixture which produces the cementitious composite material of this invention is preferably an amorphous, non-crystalline, pozzolanic silicon dioxide and is most preferably condensed silica fume.

This condensed silica fume is produced as a by-product in the electric arc furnace production of silicon or silicon alloys such as ferrosilicon. The gases which are evolved during the manufacture of ferrosilicon from quartz, coke and iron ore when they are heated to up to about 2000° C. contains Si and SiO vapors which form $SiO_2$ when they react to air as they emerge from the furnace. These vapors condense in the above process, producing a commercially available product sold as condensed silica fume.

The tiny spherical particles which result from condensation of the vapors are almost entirely amorphous silica with 20–25 $m^2$/g surface area. Typically, the particles analyze 85–92% $SiO_2$, up to 3% $Fe_2O_3$, 1–3% alkali metal oxides, 1–2% C, and the remainder being small amounts of alumina, lime and magnesia. A similar analysis is set forth in U.S. Pat. No. 4,321,243. The particles range in size from 0.01 to 0.3 micron with about 70% of the particles being smaller than 0.1 micron.

This constituent is believed to have pozzolanic properties in the present composition. Although in itself the chemically active condensed silica fume possesses little or no cementitious value, it will at ordinary temperatures and in the presence of moisture, chemically react with calcium present to form compounds possessing the desired improved cementitious properties. Two such possible reactions involving the finely divided silica fume leading to the production of tobermorite might be the following:

$$5Ca_2SiO_4 + 7SiO_2 + 10H_2O \rightarrow 2(Ca_5Si_6O_{17}.5H_2O)$$

$$5Ca_3SiO_5 + 13SiO_2 + 15H_2O \rightarrow 3(Ca_5Si_6O_{17}.5H_2O)$$

Furthermore, the use of chemically active silica fume in the mixture confers additional benefits. Because it is so finely divided, it helps to fill any interstital voids in the mixture and because it is chemically active, it reacted with any $Ca(OH)_2$ present, or which forms during the hydrolysis of the calcium silicates in the Portland Cement, and therefore counteracts the known deleterious effects which are produced when free $Ca(OH)_2$ or free CaO are present in cements.

The amount of chemically active silica fume in the mixture should be between 5 and 15% by weight of the mixture and 5.37% is a preferred amount.

The less chemically active silica comprises finely divided particles of crystalline silica which are commercially available as a product sold as Minusil ®. Minusil is a crystalline silica—and consists of finely divided—generally finer than 5 micron size particles of quartz or silica. Amounts between 8 and 25% by weight have been used with excellent results at 19.19% which is a preferred amount. The Minusil appears to fill interstitial voids in the mixture and to increase the strength of the product.

The relative proportion of flyash cenospheres, chemically active condensed silica fume and finely divided silica particles and cement are selected so as to provide a mixture which does not produce any free lime when the constituents are brought together with water. Hence the proportion of silica fume plus silica particles to cement should be between 0.475 and 0.757 with a ratio of 0.62 being preferred. The relative proportions of condensed silica fume to the relatively coarse crystalline silica particles can be varied to produce various degrees of reactivity and to alter the density and strength of the final product.

C. Additives

Several additives which enhance the fluidity and mixability of the foregoing constituents and the properties of the resulting product are utilized in the compositions of this invention.

The first additive is an epoxy resin. The epoxy resin of choice is one of the reaction products of epichlorohydrin and bisphenol A. In the present composition, the epoxy resin is added as an epoxy emulsion made with Epon 828. The emulsion is prepared by first adding the resin to a small amount of water. Then an emulsifying agent which may be anionic (e.g., polyoxyethelenonyl phenol-ammonium sulfate) or non-ionic (polyoxyethylenenonyl phenol) is added to the mixture. The emulsifier is dispersed in the resin and then the remainder of the water is gradually added.

To make a 50% solid resin emulsion requires:

| | |
|---|---|
| Liquid Resin (Epon 828) | 200.0 parts by weight |
| Emulsifying Agent (30% sol.) | 10.0 parts by weight |
| Water (distilled or deionized) | 190.0 parts by weight |
| TOTAL | 400.0 parts by weight |

To promote the cure of the resin, a curing agent is usually included. One suitable curing agent is a polyoxypropylene amine sold by Texaco as JEFFAMINE. An accelerator is usually added to promote cure of the epoxy emulsion, one such material being sold as accelerator 399 which is used with the polyoxypropylene amines used as curing agent. Various combinations of epoxy emulsion, curing agent and curing promoter are known and do not constitute the present invention. The epoxy emulsion is improved by the addition of a defoamer such as the mineral oil sold under the name NOPCO NXZ. This hazy amber liquid has a density of 7.6 lb/gal, a specific gravity of 0.91 and a flash point of 340° F. or 171° C.

To make the final mixture more fluid and to permit better wetting and mixing, a plasticizer is included in the composition, the preferred plasticizer being sold as Mighty 100 or Mighty 150 the active ingredient of which is the sodium salt of formaldehyde condensate of naphthalene beta-sulfonic acid. Mighty 100 is available as a powder and Mighty 150 is available as a liquid. While it is not intended to be bound by any theoretical explanation, it is believed that the superplasticizer affects the zeta potential of the mixture and prevents flocculation. It also appears to increase the strength of the product by permitting the use of smaller amounts of water. Other known compounds may be used in place of Mighty 100 or Mighty 150 to disperse the silica fume in the mixture. Amounts between 0 and 1.5% by weight of the mixture have proven beneficial and a particularly preferred amount is about 0.77% by weight.

D. Water

Water is the final required constituent for the mixture producing the high strength cementitious composite material of this invention. In order to obtain a product with the desired high strength, between 5.5 and 15.5% of water by weight of the mixture is added, about 6.4% being preferred. For some purposes freshly distilled or deionized water is preferred.

Two preferred embodiments of the mixtures of this invention comprise the following in parts by weight:

| | A | B |
|---|---|---|
| Class H Cement | 616 | 616 |
| Silica Fume | 84 | 84 |
| Finely Divided Silica Particles | 300 | 300 |
| Flyash Cenospheres | 280 | 280 |
| Epoxy Emulsion | 140 | 105 |
| Curing Agent (Polyoxypropylene amine) | 25 | 25 |
| Cure Accelerator | 5 | 5 |
| Superplasticizer | 12 | 12 |
| Liquid Defoamer | 1 | 1 |
| Distilled H₂O | 100 | 100 |
| Water/Cement | .17 | .24 |
| Resin/Cement | .11 | .085 |
| Aggregate/Cement | 1.07 | 1.07 |

PREPARATION OF THE MIXTURE

Each of the above mixtures was prepared according to ASTM Specification C-305 as follows:

First the Mighty 100P was added to the distilled water. Then the silica fume was added and mixed to disperse the fume in the water. Then the epoxy emulsion mix and Nopco NXZ were added to the mixture. Then the cement was added and mixed into the batch. Then the other dry ingredients were added. Finally the curing agent and cure promoter (accelerator) were added.

PROPERTIES

The above mixes (after pouring into a mold) were cured in a steam box at 60° C. for one day producing products with the following properties:

| | | |
|---|---|---|
| Compressive Strength - psi | 6125 | 6533 |
| Tensile Strength - psi | — | 610 |
| Flexural Strength - psi | 1779 | 1248 |
| Density - lbs/cu ft | 79.9 | 87 |

We claim:

1. A rapid set lightweight cement product which hardens in less than one hour and which then exhibits a density of less than 90 pounds per cubic foot and which has been poured from a mixture comprising in % by weight:

| | |
|---|---|
| Class H Portland Cement | 35 to 45 |
| mixture of Condensed Silica Fume, Flyash, Cenospheres and finely divided Crystalline Silica Particles; | 38 to 50 |
| Epoxy emulsion, Curing Agent, Accelerator | 10 to 15 |
| and Water | 5.5 to 15. |

2. The product of claim 1 in which the ratio of water/cement in the mixture is between 0.23 and 0.35.

3. The product of claim 1 in which the ratio of epoxy solids to cement is between 0.05 and 0.16.

4. The product of claim 1 in which the ratio of condensed silica fume plus finely divided crystalline silica to cement is between 0.475 and 0.757.

5. The product of claim 1 in which the proportions of aggregate to cement is about 1.07.

6. The product of claim 1 in which the mixture from which it is poured comprises in % by weight:

| | |
|---|---|
| Portland Cement | 39.41 |
| Silica Fume | 5.37 |
| Finely Divided Silica Particles | 19.19 |
| Flyash Cenospheres | 17.91 |
| Epoxy Emulsion plus Curing Agent and Curing Accelerator | 10.88 |
| Defoamer | 0.064 |
| Superplasticizer | 0.77 |
| Water | 6.4 |
| and in which the following ratio exists: | |
| Water/Cement | .255 |
| Resin/Cement | .0975 |
| Aggregate/Cement | 1.07 |

7. The product of claim 6 in which the mixture was made with distilled or deionized water.

8. The product of claim 1 in which the mixture after pouring sets to a product with a tensile strength of at least 600 psi and a compressive strength of at least 6000 psi after one day at 60° C.

* * * * *